US012562944B2

(12) United States Patent
Ozharar et al.

(10) Patent No.: US 12,562,944 B2
(45) Date of Patent: Feb. 24, 2026

(54) RADIO-CONTROLLED TWO WAY ACOUSTIC MODEM

(71) Applicant: NEC Laboratories America, Inc., Princeton, NJ (US)

(72) Inventors: Sarper Ozharar, Pennington, NJ (US); Yue Tian, Princeton, NJ (US); Yangmin Ding, East Brunswick, NJ (US); Zhuocheng Jiang, Plainsboro, NJ (US); Ting Wang, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 18/317,032

(22) Filed: May 12, 2023

(65) Prior Publication Data

US 2023/0370310 A1 Nov. 16, 2023

Related U.S. Application Data

(60) Provisional application No. 63/341,449, filed on May 13, 2022, provisional application No. 63/344,083, filed on May 20, 2022, provisional application No. 63/344,096, filed on May 20, 2022.

(51) Int. Cl.
| | |
|---|---|
| *H04L 27/00* | (2006.01) |
| *G08C 17/02* | (2006.01) |
| *H04B 3/52* | (2006.01) |
| *H04B 11/00* | (2006.01) |
| *H04J 99/00* | (2009.01) |
| *H04Q 9/00* | (2006.01) |

(52) U.S. Cl.
CPC .......... *H04L 27/0002* (2013.01); *G08C 17/02* (2013.01); *H04B 3/52* (2013.01); *H04B 11/00* (2013.01); *H04J 99/00* (2022.08); *H04Q 9/00* (2013.01); *H04Q 2209/886* (2013.01)

(58) Field of Classification Search
CPC ....... H04L 27/0002; G08C 17/02; H04B 3/52; H04B 11/00; H04J 99/00; H04Q 9/00; H04Q 2209/886
See application file for complete search history.

(56) References Cited

U.S. PATENT DOCUMENTS

| | | | | |
|---|---|---|---|---|
| 10,373,494 B1 * | 8/2019 | Krysiuk | ................. | G06Q 10/00 |
| 11,054,303 B2 * | 7/2021 | Hu | ......................... | G01H 9/004 |
| 2018/0128927 A1 * | 5/2018 | Tenghamn | ............. | G01V 1/006 |
| 2018/0153450 A1 * | 6/2018 | Routh | .................. | A61B 5/7445 |
| 2020/0005036 A1 * | 1/2020 | Ji | ............................. | G06T 5/70 |

(Continued)

*Primary Examiner* — Amine Benlagsir
(74) *Attorney, Agent, or Firm* — Vincent Duffy; Joseph Kolodka

(57) ABSTRACT

A radio-controlled, two-way acoustic modem for operating with a distributed fiber optic sensing (DFOS) system including circuitry that receives radio signals including configuration information, configures the modem to operate according to the configuration information, and generate acoustic signals that are detected by the DFOS system. The acoustic modem includes one or more sensors that detect environmental information that is encoded in the acoustic signals for further reception by the DFOS system. The received configuration information may change the operating times, sensors or other operating aspects of the modem as desired and such information may be transmitted from a fixed location or a mobile vehicle.

7 Claims, 13 Drawing Sheets

(56)     References Cited

U.S. PATENT DOCUMENTS

| | | | |
|---|---|---|---|
| 2020/0249078 A1* | 8/2020 | Hu | G01H 9/004 |
| 2022/0007131 A1* | 1/2022 | Ivanov | G01S 5/0072 |
| 2022/0302753 A1* | 9/2022 | Marquis | H02J 50/001 |
| 2024/0154603 A1* | 5/2024 | Ballandras | G01K 11/265 |

* cited by examiner

DAC: Digital-to-analog converter
ADC: Analog-to-digital converter
DSP: Digital signal processing
WDM: Wavelength division multiplexer
BPF: Band-pass filter
LPF: Low-pass filter

RADIO-CONTROLLED TWO WAY ACOUSTIC MODEM

CROSS-REFERENCE TO RELATED APPLICATIONS

This application claims the benefit of U.S. Provisional Patent Application Ser. No. 63/341,449 filed May 13, 2022, U.S. Provisional Patent Application Ser. No. 63/344,083 filed May 20, 2022, and U.S. Provisional Patent Application Ser. No. 63/344,096 filed May 20, 2022 the entire contents of each of which is incorporated by reference as if set forth at length herein.

FIELD OF THE INVENTION

This application relates generally to distributed fiber optic sensing (DFOS) systems, methods, and structures and related technologies. More particularly, it pertains to a radio-controlled, two way acoustic modem used to impart vibrational signals on a fiber optic sensor.

BACKGROUND OF THE INVENTION

Distributed fiber optic sensing (DFOS) technologies including Distributed Acoustic Sensing (DAS), Distributed Vibration Sensing (DVS), and Distributed Temperature Sensing (DTS) have proven themselves to be most useful for sensing acoustic events, vibrational events, and temperatures in a plethora of contemporary applications. Given this importance, improvements in DFOS technologies or complementary systems would represent a welcome addition to the art.

SUMMARY OF THE INVENTION

An advance in the art is made according to aspects of the present disclosure directed to a radio-controlled, two-way acoustic modem for use with a distributed fiber optic sensing (DFOS) system and method.

In sharp contrast to the prior art and viewed from a first aspect, our inventive radio-controlled acoustic modem advantageously receives wireless radio signals which are used to change the operational settings of the acoustic modem. This allows the acoustic modem to be controlled remotely and adjust its operational characteristics. The two-way acoustic modem may include one or more sensors that generate environmental information that may be acoustically encoded, and acoustically excite a nearby sensing fiber for detection/analysis by the DFOS system.

In further contrast to the prior art, and viewed from another aspect, our inventive acoustic modem employs a novel method of acoustic modem communication over a DFOS/DAS system that advantageously scales up data transfer speeds from the field to a central office or other location where a DFOS/DAS interrogator is located. Operationally, our inventive acoustic modem communicates an acoustic vibration code in a spatially multiplexed manner. Instead of employing only a single vibrator—or shaker, or speaker—our inventive spatially multiplexed acoustic modem employs multiple vibrators that are positioned at different locations along a sensing fiber. So long as those multiple vibrators as spaced further than the resolution of the DFOS/DAS system, the DFOS/DAS system can detect the signals of those multiple vibrators simultaneously. As a result, when n vibrators are employed, a data transfer rate may be increased n-fold.

Finally, in further contrast to the prior art, and viewed from yet another aspect, our inventive acoustic modem taps wirelessly into high power lines to charge itself and power its sensors and vibrators for acoustic data transmission. As a result, our acoustic modem charges itself and may transmit integrated sensor data through an OPGW (optical ground wire) cable via vibrations.

DETAILED DESCRIPTION OF THE INVENTION

Figure 1A:
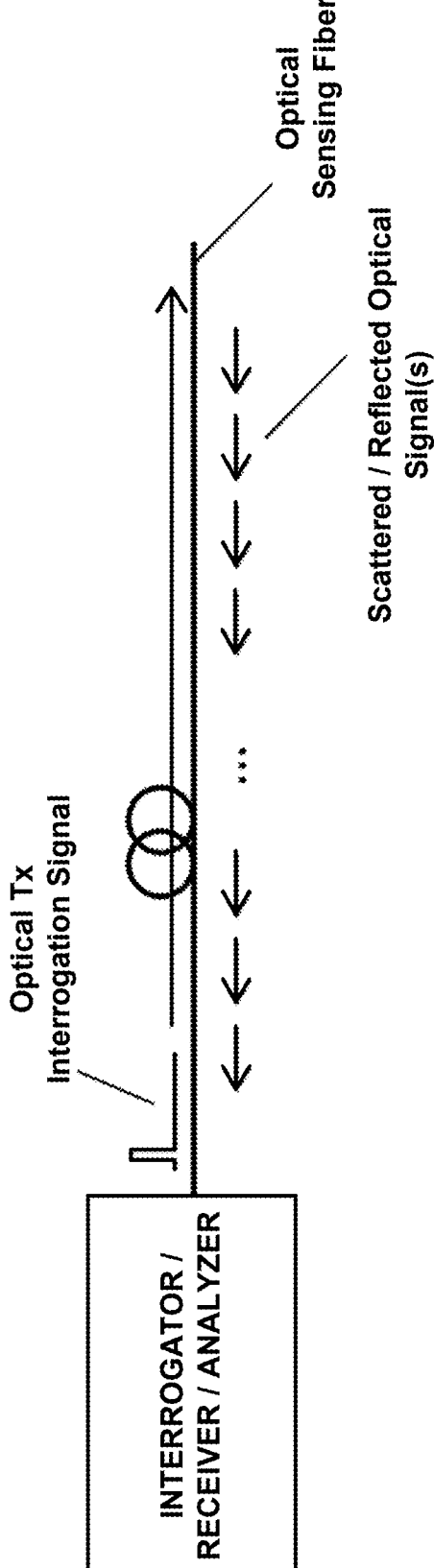
FIG. 1(A) and FIG. 1(B) are schematic diagrams showing an illustrative prior art uncoded and coded DFOS systems.

The following merely illustrates the principles of this disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor (s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we note that distributed fiber optic sensing systems interconnect optoelectronic integrators to an optical fiber (or cable), converting the fiber to an array of sensors distributed along the length of the fiber. In effect, the fiber becomes a sensor, while the interrogator generates/injects laser light energy into the fiber and senses/detects events along the fiber length.

As those skilled in the art will understand and appreciate, DFOS technology can be deployed to continuously monitor vehicle movement, human traffic, excavating activity, seismic activity, temperatures, structural integrity, liquid and gas leaks, and many other conditions and activities. It is used around the world to monitor power stations, telecom networks, railways, roads, bridges, international borders, critical infrastructure, terrestrial and subsea power and pipelines, and downhole applications in oil, gas, and enhanced geothermal electricity generation. Advantageously, distributed fiber optic sensing is not constrained by line of sight or remote power access and—depending on system configuration—can be deployed in continuous lengths exceeding 30 miles with sensing/detection at every point along its length. As such, cost per sensing point over great distances typically cannot be matched by competing technologies.

Distributed fiber optic sensing measures changes in "backscattering" of light occurring in an optical sensing fiber when the sensing fiber encounters environmental changes including vibration, strain, or temperature change events. As noted, the sensing fiber serves as sensor over its entire length, delivering real time information on physical/environmental surroundings, and fiber integrity/security. Furthermore, distributed fiber optic sensing data pinpoints a precise location of events and conditions occurring at or near the sensing fiber.

Figure 1B:
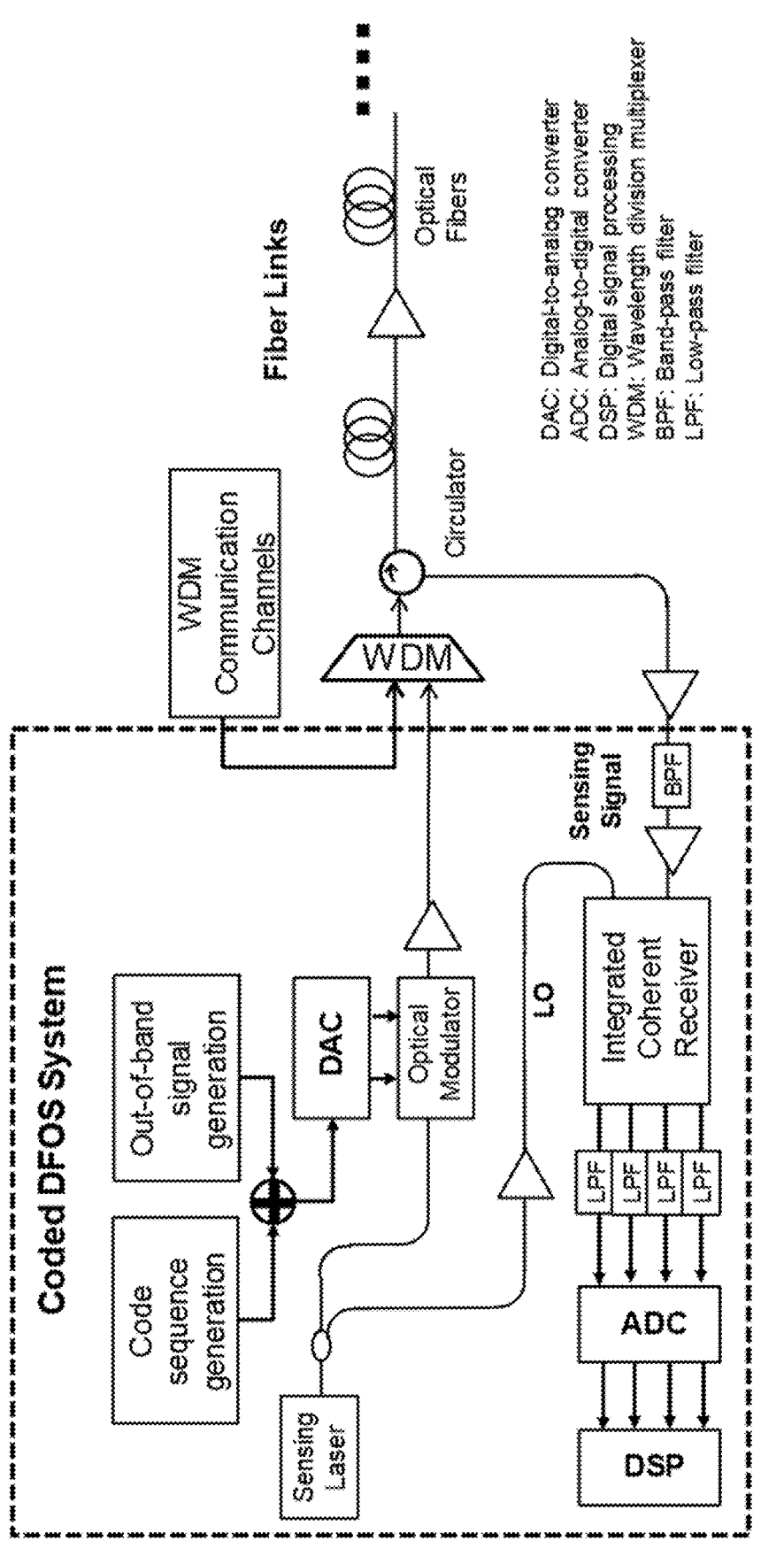

A schematic diagram illustrating the generalized arrangement and operation of a distributed fiber optic sensing system that may advantageously include artificial intelligence/machine learning (AI/ML) analysis is shown illustratively in FIG. 1(A). With reference to FIG. 1(A), one may observe an optical sensing fiber that in turn is connected to an interrogator. While not shown in detail, the interrogator may include a coded DFOS system that may employ a coherent receiver arrangement known in the art such as that illustrated in FIG. 1(B).

As is known, contemporary interrogators are systems that generate an input signal to the optical sensing fiber and detects/analyzes reflected/backscattered and subsequently received signal(s). The received signals are analyzed, and an output is generated which is indicative of the environmental conditions encountered along the length of the fiber. The backscattered signal(s) so received may result from reflections in the fiber, such as Raman backscattering, Rayleigh backscattering, and Brillion backscattering.

As will be appreciated, a contemporary DFOS system includes the interrogator that periodically generates optical pulses (or any coded signal) and injects them into an optical sensing fiber. The injected optical pulse signal is conveyed along the length optical fiber.

At locations along the length of the fiber, a small portion of signal is backscattered/reflected and conveyed back to the interrogator wherein it is received. The backscattered/reflected signal carries information the interrogator uses to detect, such as a power level change that indicates—for example—a mechanical vibration.

The received backscattered signal is converted to electrical domain and processed inside the interrogator. Based on the pulse injection time and the time the received signal is detected, the interrogator determines at which location along the length of the optical sensing fiber the received signal is returning from, thus able to sense the activity of each location along the length of the optical sensing fiber. Classification methods may be further used to detect and locate events or other environmental conditions including acoustic and/or vibrational and/or thermal along the length of the optical sensing fiber.

Figure 2:
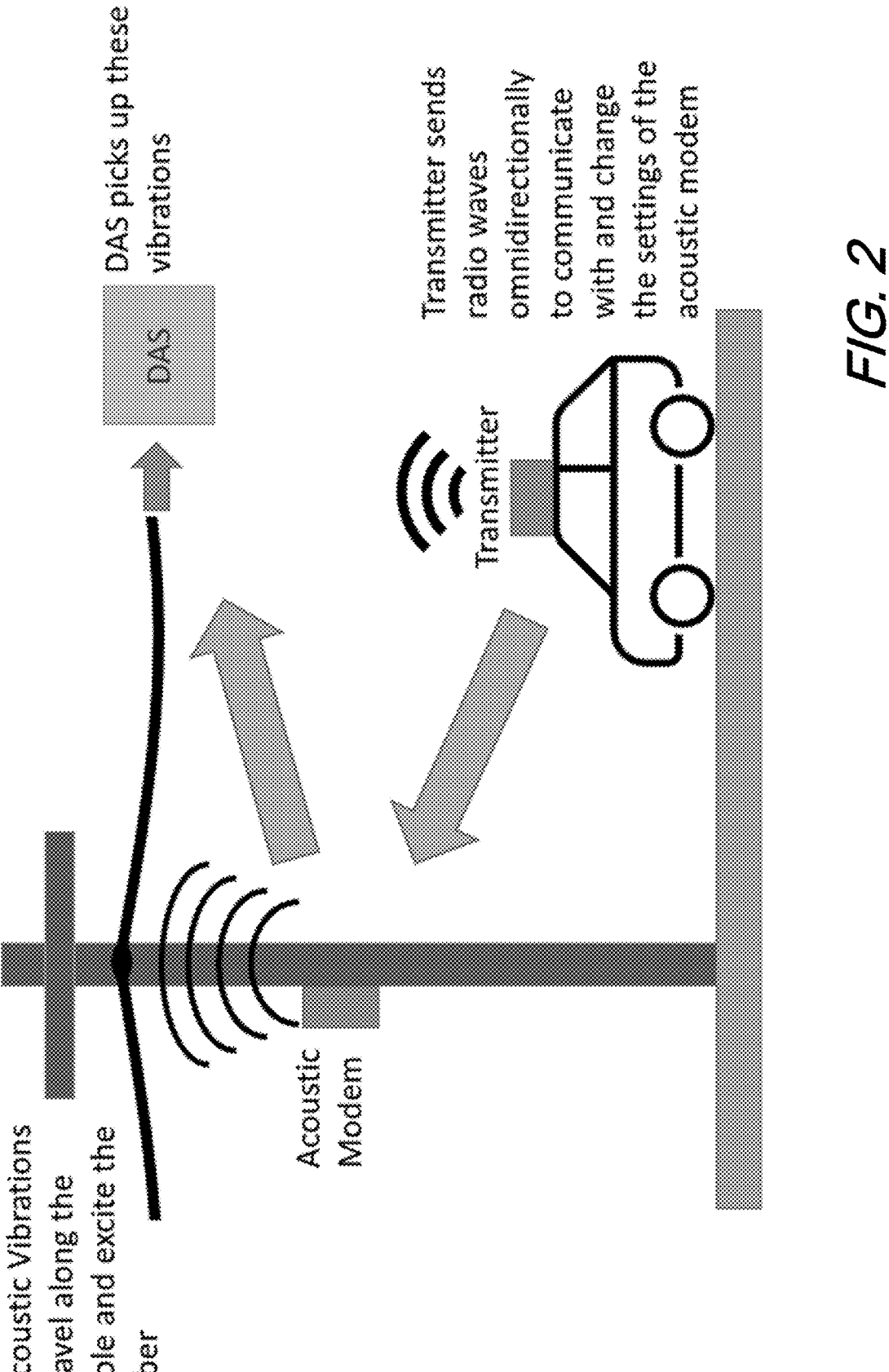
FIG. 2. Is a schematic diagram showing an illustrative wireless programming of an acoustic modem according to aspects of the present disclosure.

FIG. 2. Is a schematic diagram showing an illustrative DFOS operation including an acoustic modem positioned on a utility pole that suspends a fiber optic sensor cable that is a component of a DFOS system. As illustrated in that figure, the acoustic modem produces acoustic signals that in turn excite the fiber optic sensor cable producing vibrations that are detected/interpreted by operation of a DFOS/DAS system. As noted, the acoustic modem supports radio-controlled, two-way communications such that it will receive/respond to appropriate radio signals transmitted thereto.

In the illustrative scenario shown in the figure, a vehicle is equipped with a wireless transmitter which emits radio waves to communicate with and change the settings of the acoustic modem. Depending upon the actual distance between the acoustic modem and—for example—a central office, the transmitter can be located at the central office (or other fixed location) or on a mobile station such as a vehicle shown in the figure.

As those skilled in the art will readily appreciate, our inventive radio controlled acoustic modem to provide—for example—snow depth measurements that can be disabled in summer months and turned back on in the winter. Alternatively, a transmission period of the acoustic modem may be modified as desired by an operator.

As illustratively shown, wireless radio signals transmitted to the acoustic modem may be from a fixed station or it can be from a vehicle-moving or stationary. In a preferred embodiment, the wireless radio signals may be on an unlicensed radio frequency band or use a known protocol.

In a preferred embodiment, our inventive wireless, radio-controlled acoustic modem employs two-way communications over two different media.

A first type of communications and medium employs acoustic vibrations that excite a nearby fiber cable and can be detected by a DFOS/DAS system over a distance of at least 50 km. This medium—the DFOS/DAS optical fiber sensor cable—is deployed from the acoustic modem to the interrogator that may be located in a central office.

A second type of communications and medium employs wireless radio signal in the unlicensed frequency bands, one of the ISM (Industrial, Scientific and Medical) Bands. Even though such radio bands are unlicensed, they are not unrestricted. A main restriction is that transmission power levels cannot be very large, which means the distance between the radio receiver (the acoustic modem) and transmitter (controller) should be around 100 meters or less. Depending on the distance between the acoustic modem and the central office, the transmitter can be either on the central office or on a mobile station, such as a car. Such operation is shown schematically in FIG. 2.

In summary our inventive radio-controlled acoustic modem provides: dual communication capability for the acoustic modem; and a mobile transmitter allows city-wide control of acoustic modems. In addition to permitting the switching on and off of the acoustic modem, the measurement settings of the acoustic modem (such as sensitivity, accuracy, etc.) may be tuned and modified as necessary or desired as sensing requirements and/or environmental conditions change.

Figure 3:
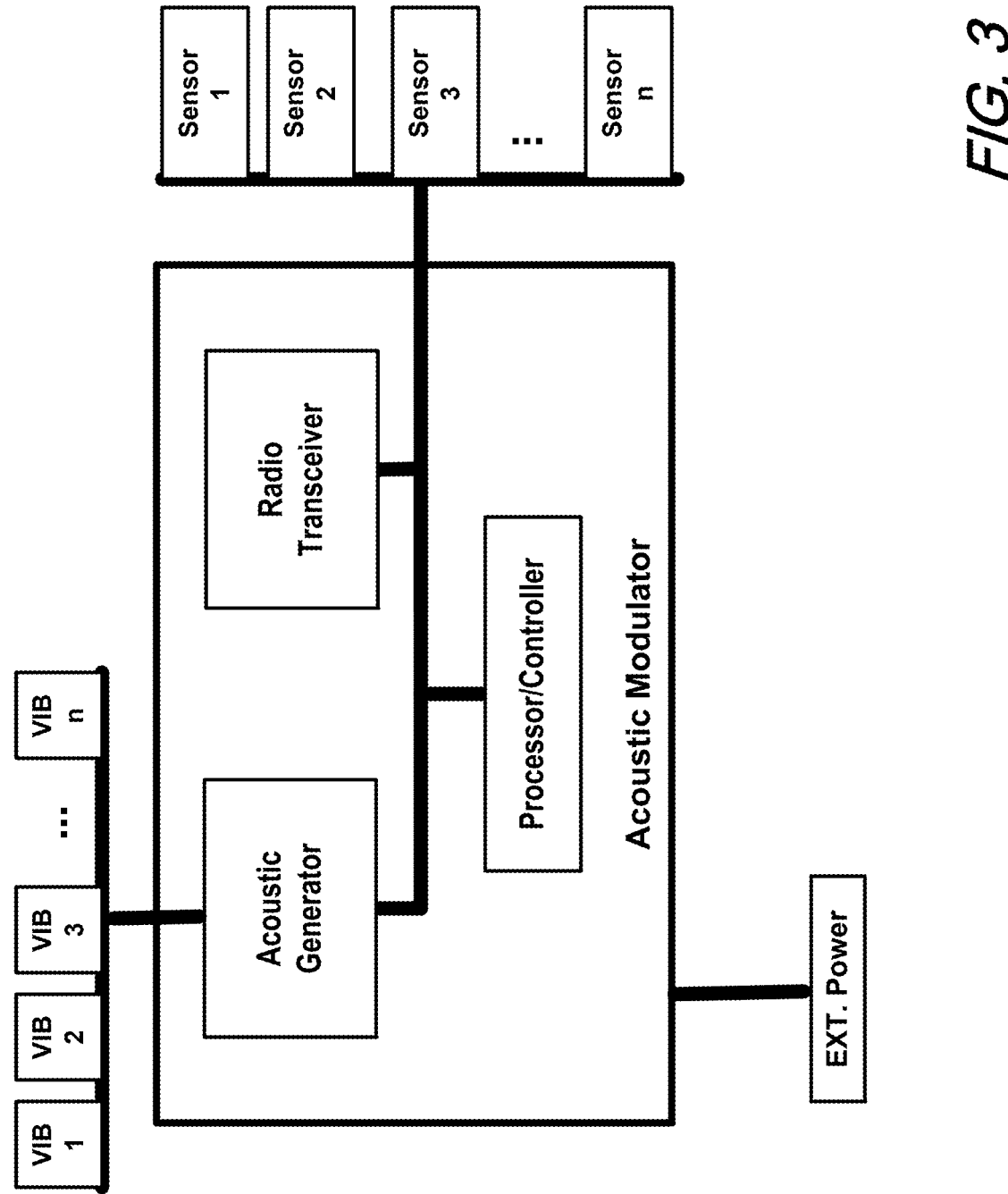
FIG. 3 is a schematic block diagram showing illustrative component elements of an acoustic modem according to aspects of the present disclosure.

FIG. 3 is a schematic block diagram showing illustrative component elements of an acoustic modem according to aspects of the present disclosure. As illustratively shown, the acoustic modem includes an acoustic/vibration generator, a transceiver—that may advantageously provide the multimode communications described, and a controller/computer for coordinating the operation of the acoustic modem.

Figure 4:
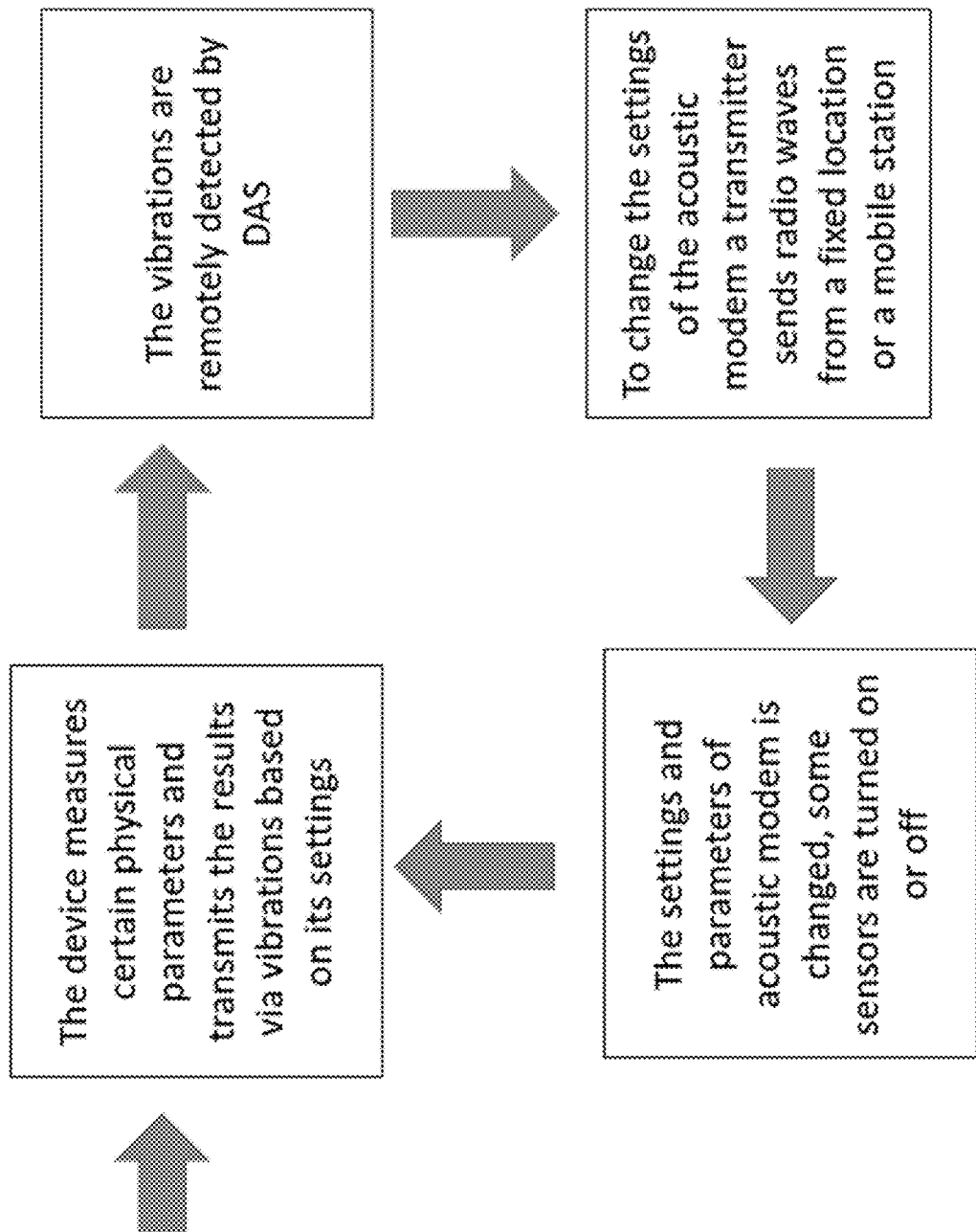
FIG. 4 is a schematic flow diagram showing operational workflow of the operation of a DFOS/DAS and our illustrative wireless acoustic modem according to aspects of the present disclosure.

FIG. 4 is a schematic flow diagram showing operational workflow of the operation of a DFOS/DAS and our illustrative wireless acoustic modem according to aspects of the present disclosure. As shown in that figure, the acoustic modem is first mounted in a location such that it has physical contact with a nearby fiber cable. Next, the acoustic modem measures certain physical parameters and transmits the results via vibrations based on its settings. The vibrations are remotely detected by DFOS/DAS. To change the settings of the acoustic modem, a transmitter sends radio waves from a fixed or mobile station to the acoustic modem with configuration/settings data which are received and then used by the acoustic modem controller to reconfigure its operational parameters. Finally, the settings and parameters of the acoustic modem are changed, and such changes may include sensors being turned off or on as necessary or desired.

Figure 5:
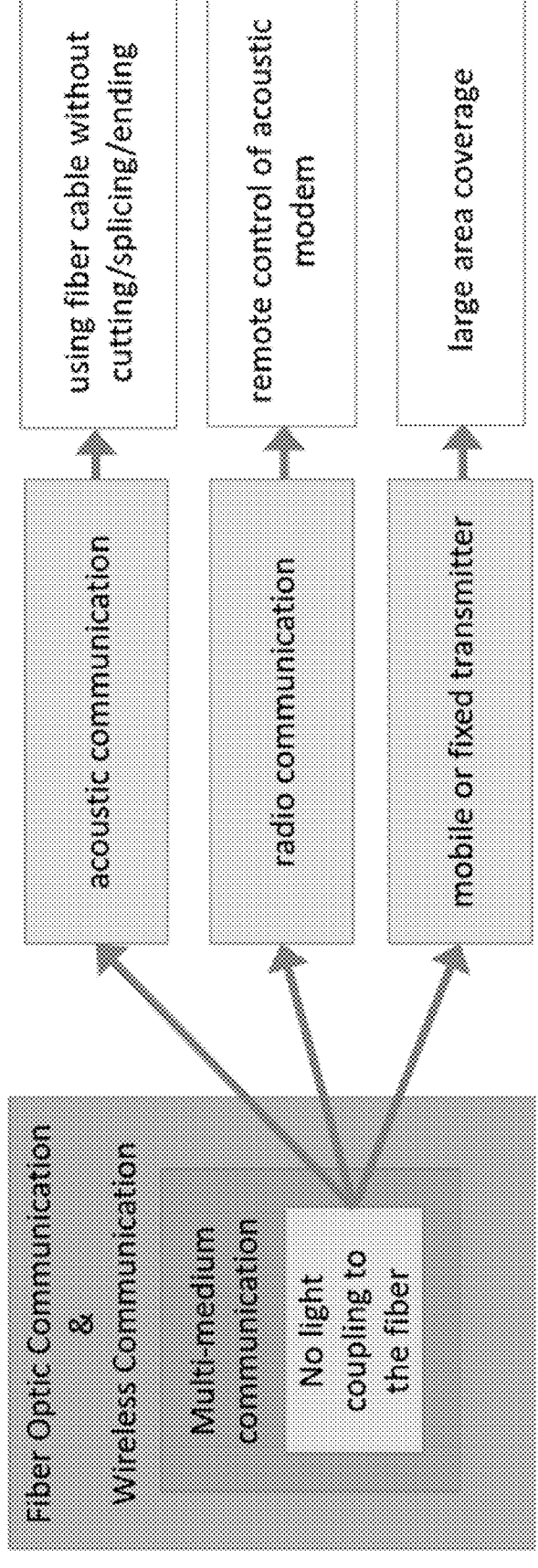
FIG. 5 is a schematic diagram showing illustrative features for DFOS/DAS systems employing our illustrative wireless acoustic modem according to aspects of the present disclosure.

FIG. 5 is a schematic diagram showing illustrative features for DFOS/DAS systems employing our illustrative wireless acoustic modem according to aspects of the present disclosure. As schematically illustrated in that figure, the acoustic modem exhibits both fiber optic communication (through acoustic/vibrational activity) and wireless communications. Its acoustic communication provides a communication medium—the fiber optic sensor cable that is part of the DFOS/DAS—without cutting/splicing/ending. The radio communications allows for the remote control of the acoustic modem and provides for the reconfiguration of the acoustic modem, wirelessly. Finally, the radio communications including reconfiguration information may be provided from a mobile or fixed location, thereby providing great versatility in reconfiguration.

According to another aspect of the present disclosure and our inventive acoustic modem, we have further improved it by providing it with the facility to transmit acoustic vibration codes in a spatially multiplexed way. Instead of using a single vibrator (or shaker, or speaker) our inventive spatially multiplexed acoustic modem operation uses multiple vibrator sources that are placed on different locations along the fiber optic sensor cable. So long as those multiple vibrators are spaced farther than the resolution of the DFOS/DAS system, the DFOS/DAS operation can detect/collect signals from those vibrators simultaneously. This means by using n vibrators, data transfer rates can be increased n-fold.

As those skilled in the art will understand and appreciate, our inventive spatially multiplexed operation is made possible by the detection capabilities of the DFOS/DAS system, since it can collect data from multiple points along the fiber cable. As a result, our spatially multiplexed acoustic modem can transmit data from multiple points via multiple vibrator sources.

As those skilled in the art will readily appreciate, our inventive spatially multiplexed acoustic modems provide for a unique operation in the data transmission, and data reception operation of DFOS/DAS. For data transmission, we employ spatial multiplexing in the acoustic domain (i.e., different parts of the data will be transmitted via different vibrators at the same time but at different points along the fiber. For the data reception, the DFOS/DAS system receives/detects/decodes DFOS/DAS data simultaneously from multiple points along a fiber optic sensor cable route. In other words, the detected signal from different points are combined and analyzed as a single transmission.

Figure 6:
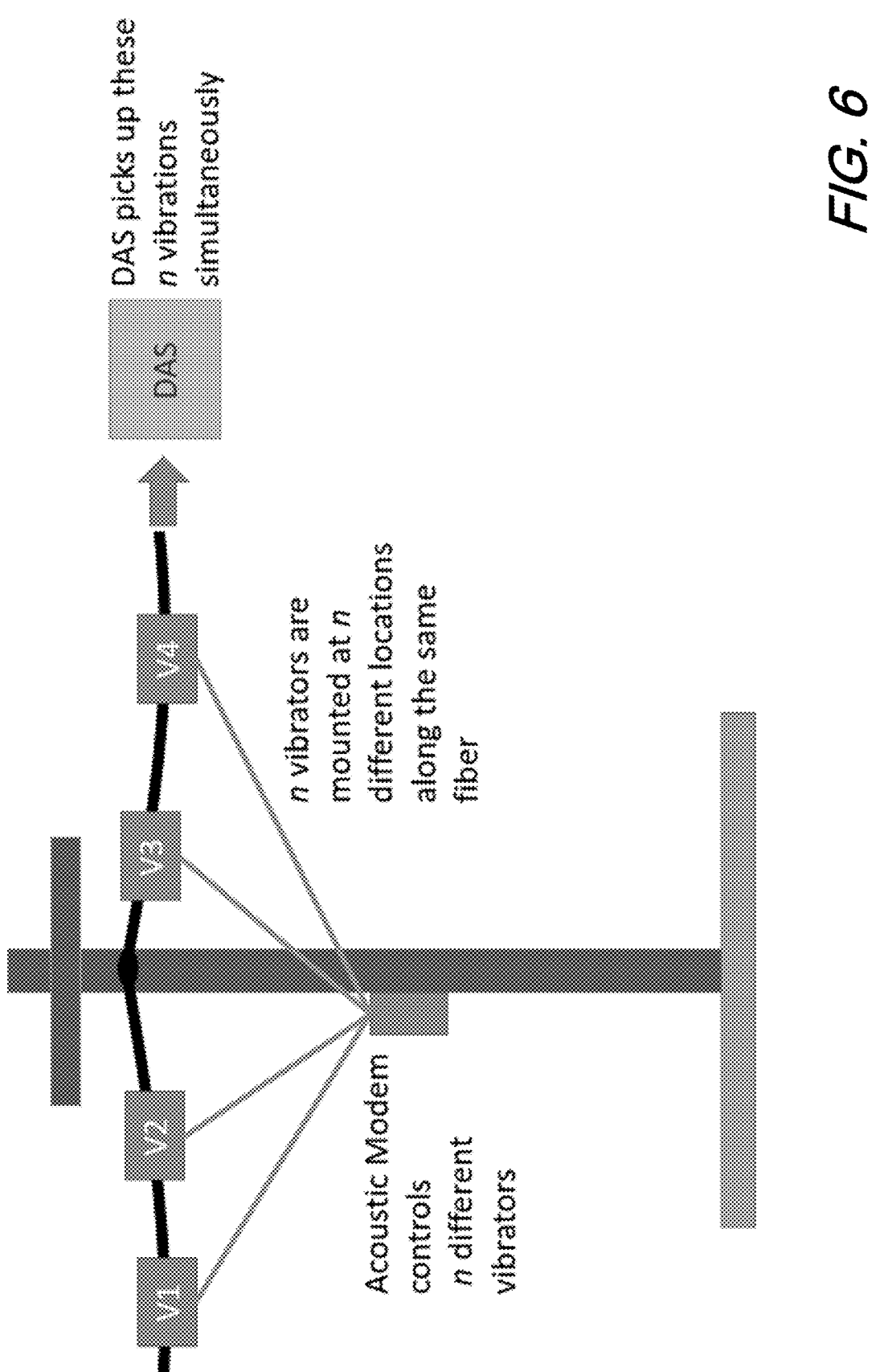
FIG. 6 is a schematic diagram showing illustrative spatially multiplexed acoustic modem setup and operation according to aspects of the present disclosure.

FIG. 6 is a schematic diagram showing illustrative spatially multiplexed acoustic modem setup and operation according to aspects of the present disclosure. As illustratively shown, a series of n vibrators are mounted at n different locations along the fiber optic cable sensor route. The n vibrators are controlled by a single acoustic modem. The n vibrators simultaneously operate at different frequencies, which are simultaneously received/detected/analyzed by a single DFOS/DAS interrogator.

Figure 7:
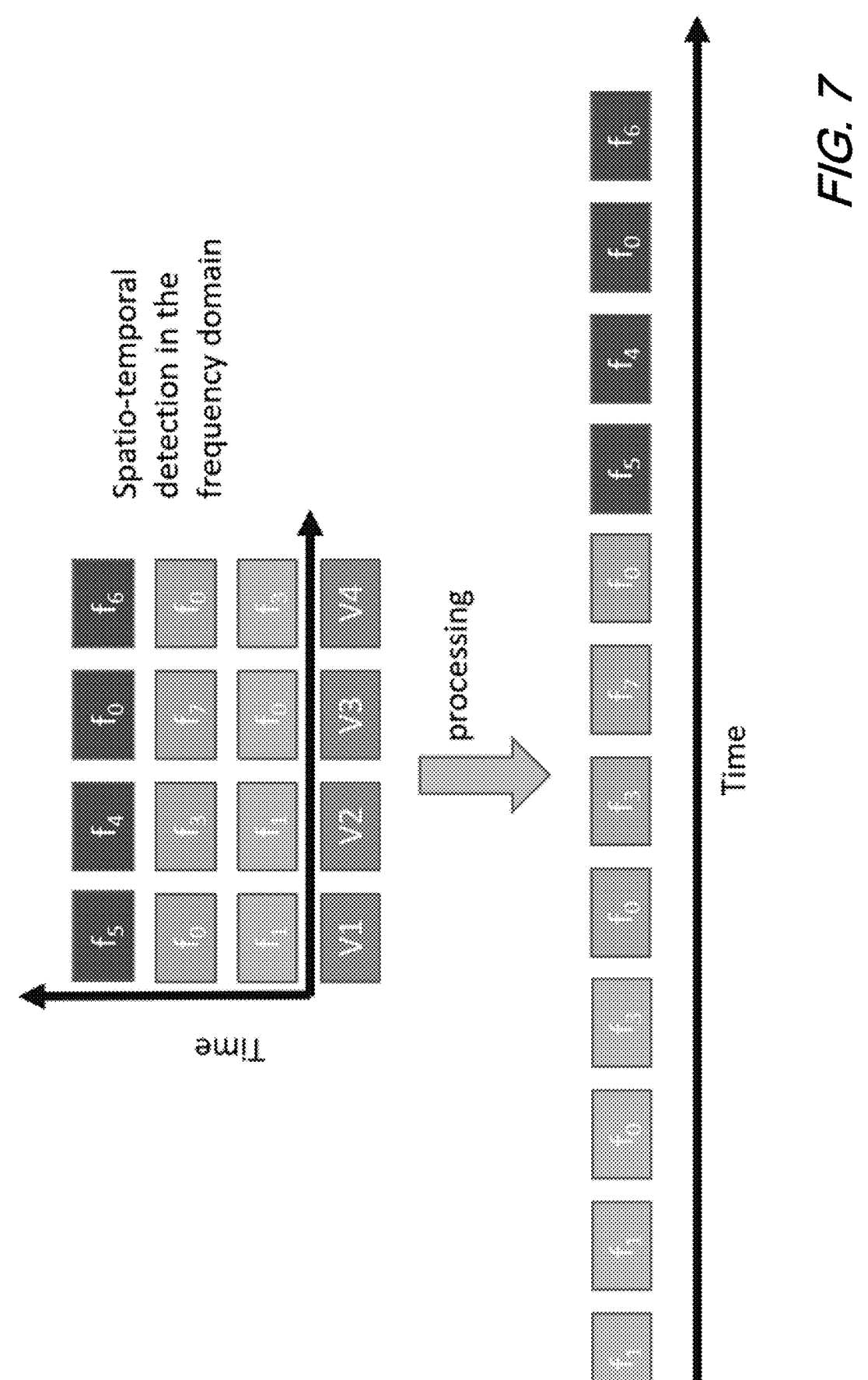
FIG. 7 is a schematic diagram illustrating overall working principle of spatially multiplexed acoustic modem according to aspects of the present disclosure.

FIG. 7 is a schematic diagram illustrating the overall working principle of spatially multiplexed acoustic modem according to aspects of the present disclosure.

Initially, the acoustic modem together with its n vibrators should be installed on the field. n vibrators should be installed at n different locations in such a way that they will couple to a single point along the fiber and they are separated by at least the spatial resolution of the DFOS/DAS system. The data transmitted can be sensor data, time value or any other data. Before the data is transmitted, the acoustic modem splits the data into n pieces for n vibrators. Then the acoustic modem does the bit to frequency mapping (i.e. 101 corresponds to $f_c$). Then the acoustic modem determines the n different frequency vibration patterns, and the vibrators realize these vibrations. Once the vibrations are coupled to the fiber, those vibrations are detected by the DAS system and demultiplexed and decoded. Hence the full data stream is recovered.

Figure 8:
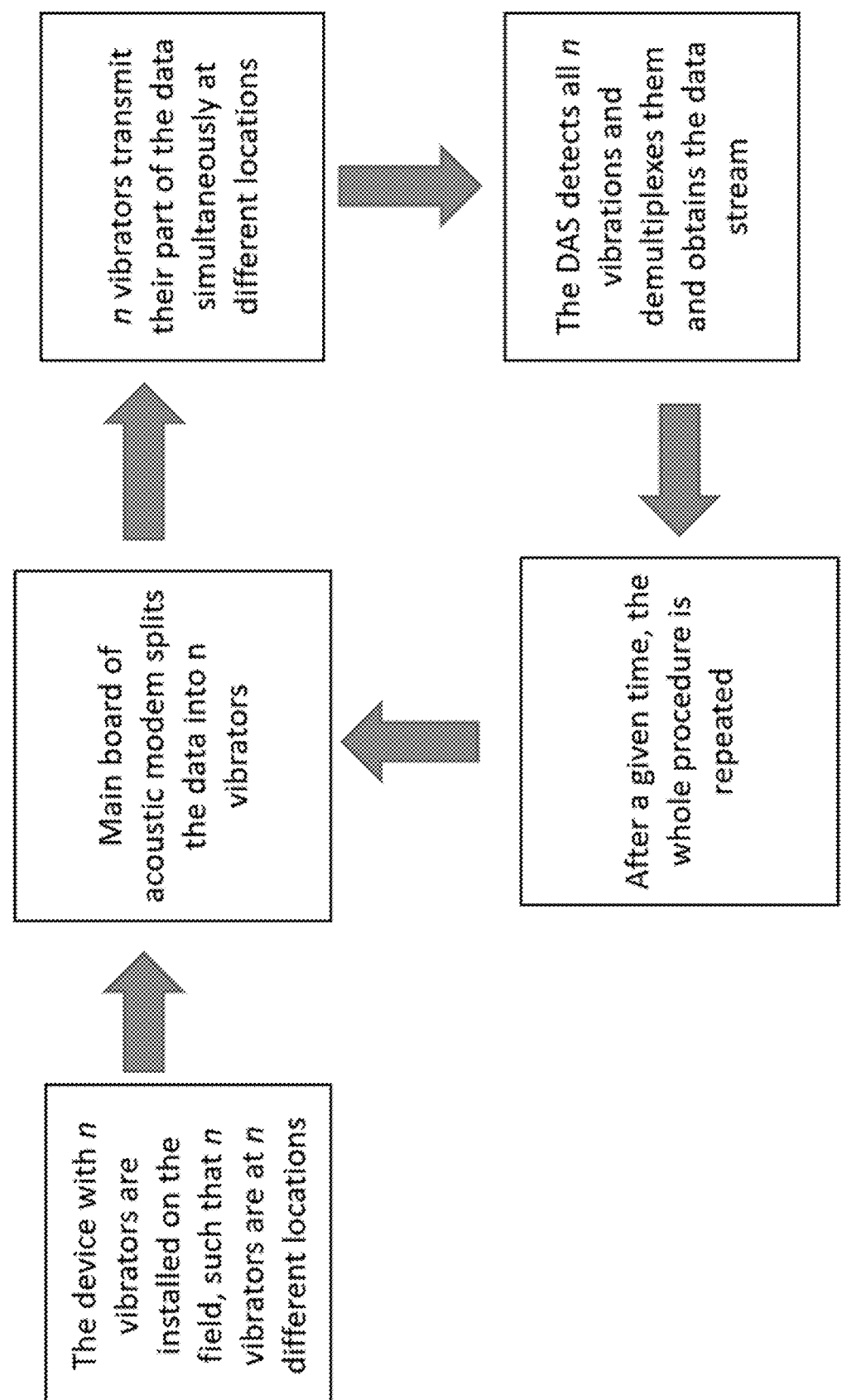
FIG. 8 is a schematic flow diagram showing operational workflow of the operation of a DFOS/DAS and our illustrative spatially multiplexed acoustic modem according to aspects of the present disclosure.

FIG. 8 is a schematic flow diagram showing operational workflow of the operation of a DFOS/DAS and our illustrative spatially multiplexed acoustic modem according to aspects of the present disclosure. As illustrated, a spatially multiplexed acoustic modem according to aspects of the present disclosure with n vibrators is installed in the field, such that the n vibrators are positioned at different locations along the fiber optic sensor cable. The main board/processor of the acoustic modem splits the data and sends it respectively to the n vibrators. The n vibrators transmit their portion of the data simultaneously from their different locations. The DFOS/DAS detects all DFOS/DAS signals from the n vibrators and demultiplexes them to obtain a single data stream and analyzes the single stream to decode the data. Finally, the entire operation is repeated.

Initially, the acoustic modem together with its n vibrators should be installed in the field. n vibrators are installed at n different locations in such a way that they will couple to a single point along the fiber. They are separated by at least spatial resolution of the DAS system. The data can be sensor data, time value or any other data. Before the data is transmitted, the acoustic modem splits the data into n pieces for the n vibrators. Then the acoustic modem does the bit to frequency mapping (i.e. 101 corresponds to $f_c$). Then the acoustic modem determines the n different frequency vibration patterns, and the vibrators realize these vibrations. Once the vibrations are coupled to the fiber, those vibrations are detected by the DAS system and demultiplexed and decoded. Hence the full data stream is recovered.

Figure 9:
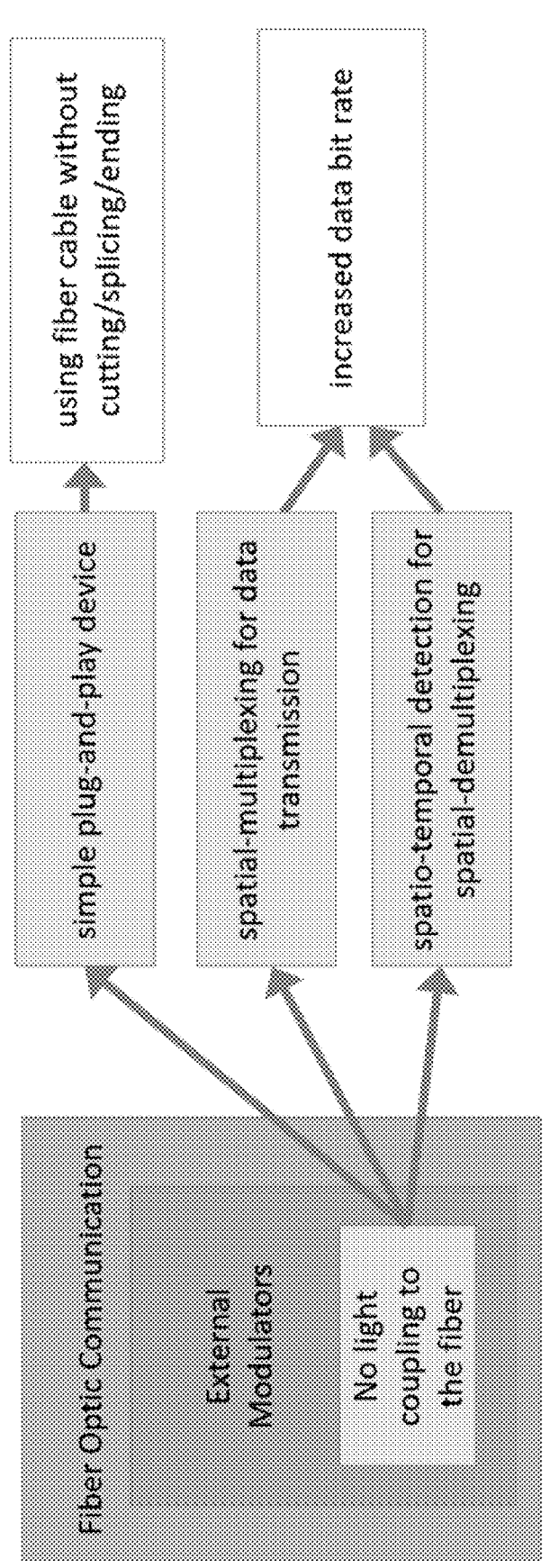
FIG. 9 is a schematic diagram showing illustrative features for DFOS/DAS systems employing our illustrative spatially multiplexed acoustic modem according to aspects of the present disclosure.

FIG. 9 is a schematic diagram showing illustrative features for DFOS/DAS systems employing our illustrative spatially multiplexed acoustic modem according to aspects of the present disclosure.

We now note that, due to the power requirements of the acoustic modem, their practicality and wide use may be limited, since it requires installation in locations with available electrical power to operate over extended periods without technician intervention.

Accordingly, we provide our acoustic modem with wireless power tapping from high voltage lines to power the acoustic modem. Since such powering requires proximity to high-power electrical lines, it will be optimized for applications related to monitoring such high-power lines.

Operationally, our inventive acoustic is an upgraded acoustic modem, that taps wirelessly into high power lines to charge itself and power its sensors and vibrators for periods of extended operation or continued operational readiness. Our approach uses a wireless energy harvester similar to wireless charging technology. As a result, our acoustic modem charges itself and transmit the integrated sensor data through an OPGW (optical ground wire) cable via vibrations.

Advantageously, our inventive acoustic modem uses power tapping from high voltage lines to power the acoustic modem thereby making operation near high voltage lines practical. Since the acoustic modem exploits detection capabilities of DFOS/DAS systems, it only needs to generate mechanical vibrations in the vicinity of the optical ground wire (OPGW) cable but can still be detected by a DFOS/DAS interrogator system located many kilometers away.

Figure 10:
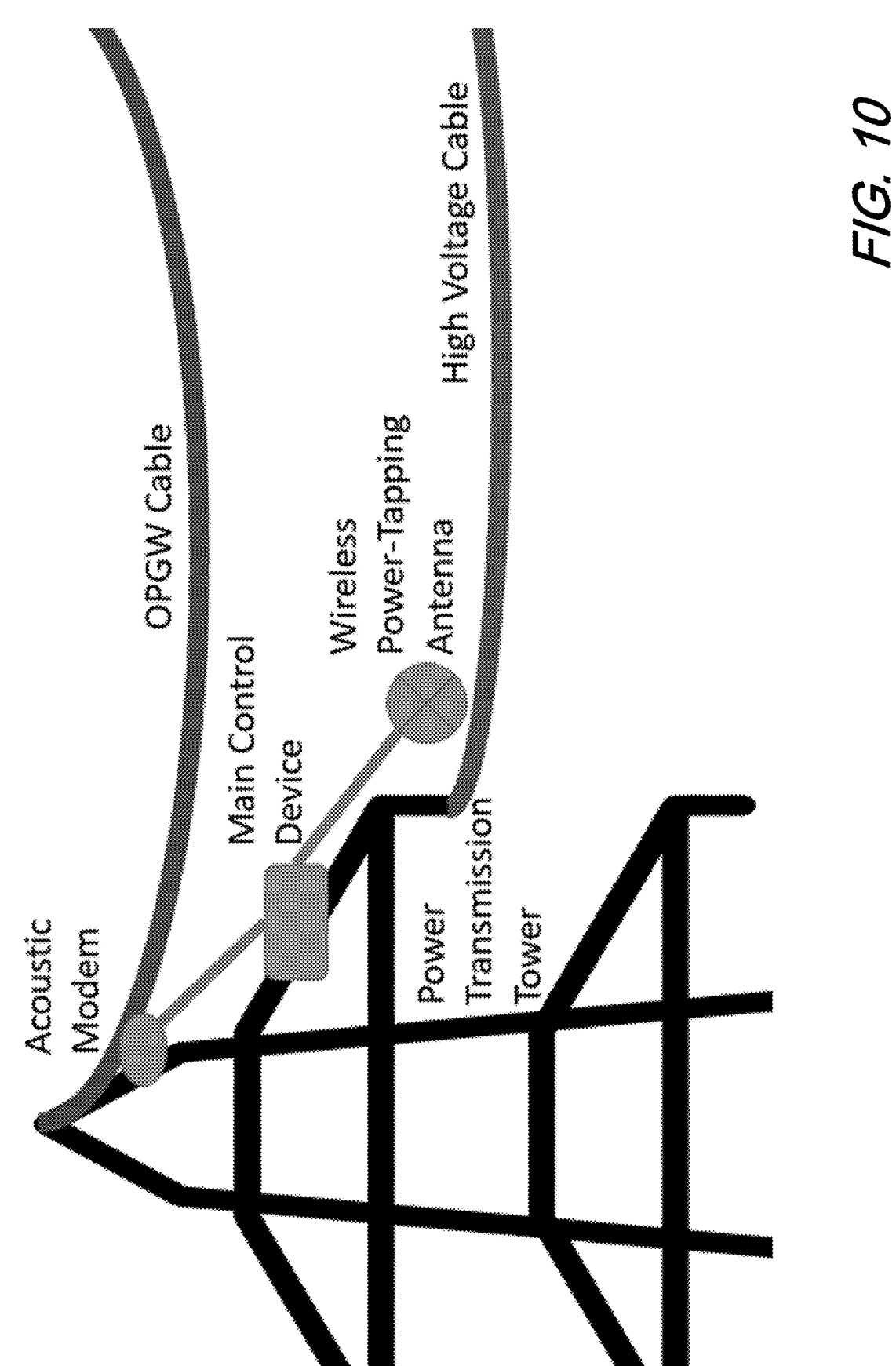
FIG. 10 is a schematic diagram showing illustrative operation of our illustrative energy harvesting acoustic modem according to aspects of the present disclosure.

FIG. 10 is a schematic diagram showing illustrative operation of our illustrative energy harvesting acoustic modem according to aspects of the present disclosure. As may be observed from this figure, our inventive acoustic modem that harvests electrical energy includes at least three main operational components. A first component, a main control device, that includes sensors, and rechargeable batteries. A second component is a wireless power tapping antenna, that is positioned in the vicinity of a high voltage cable, but not in physical contact. This component is responsible for obtaining and providing wireless electric energy to the main control device. A third component is the acoustic modem that may include a shaker/vibrator and is mounted on or near the OPGW cable. An additional is a DFOS/DAS system including interrogator that interrogates the OPGW cable and detects the vibrations generated by the shaker/vibrator of the device.

One advantageous feature of our inventive acoustic modem with energy harvesting is that it is a completely isolated system in terms of electrical power. Our modem not need an optical connection, nor a "hard", physical electrical connection. It does not need to receive some communication or control signal externally either. It is a completely self-contained device that can charge itself, do its preprogrammed mission (such as measuring certain physical parameters (temperature, humidity, pressure, snow level, etc.) and transmit those values via vibrations in predetermined time intervals), and is also plug and play.

Figure 11:
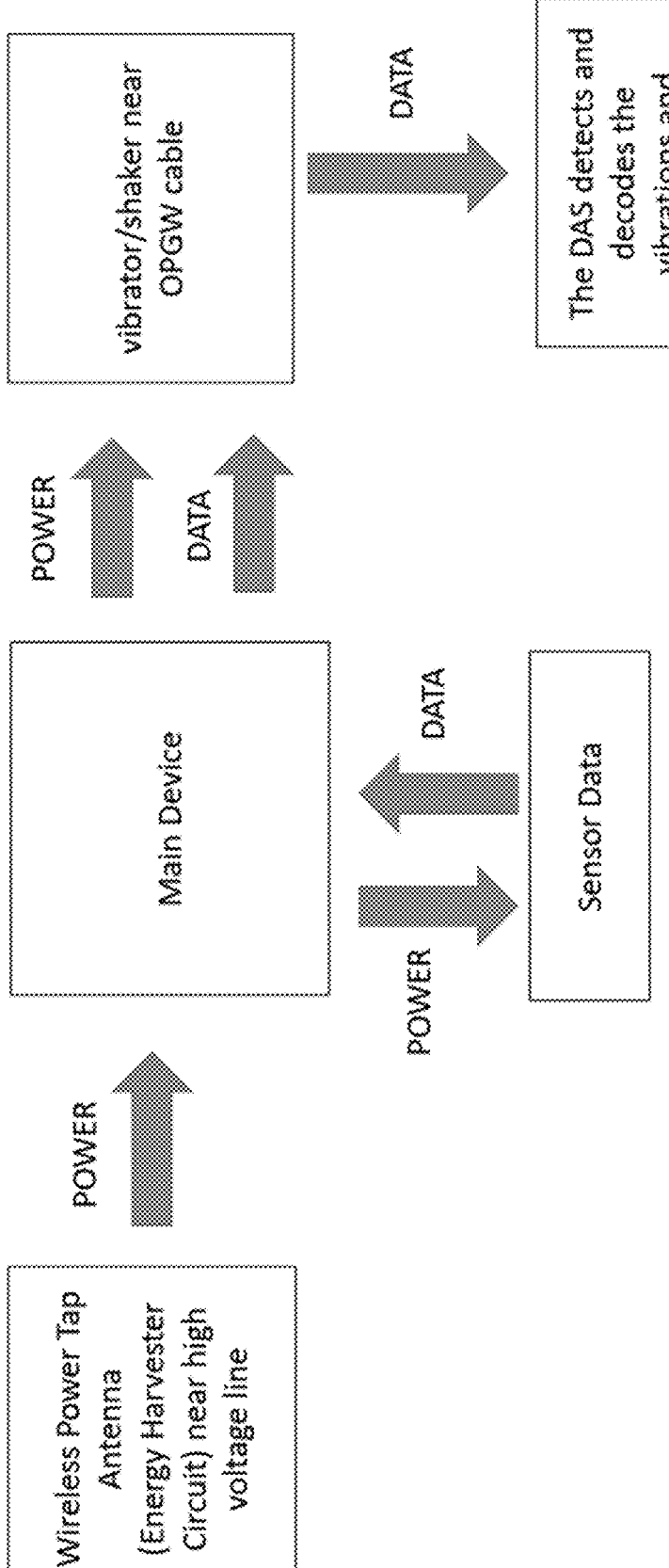
FIG. 11 is a schematic flow diagram showing operational workflow of the operation of a DFOS/DAS and our illustrative energy harvesting acoustic modem according to aspects of the present disclosure.

FIG. 11 is a schematic flow diagram showing operational workflow of the operation of a DFOS/DAS and our illustrative energy harvesting acoustic modem according to aspects of the present disclosure.

Figure 12:
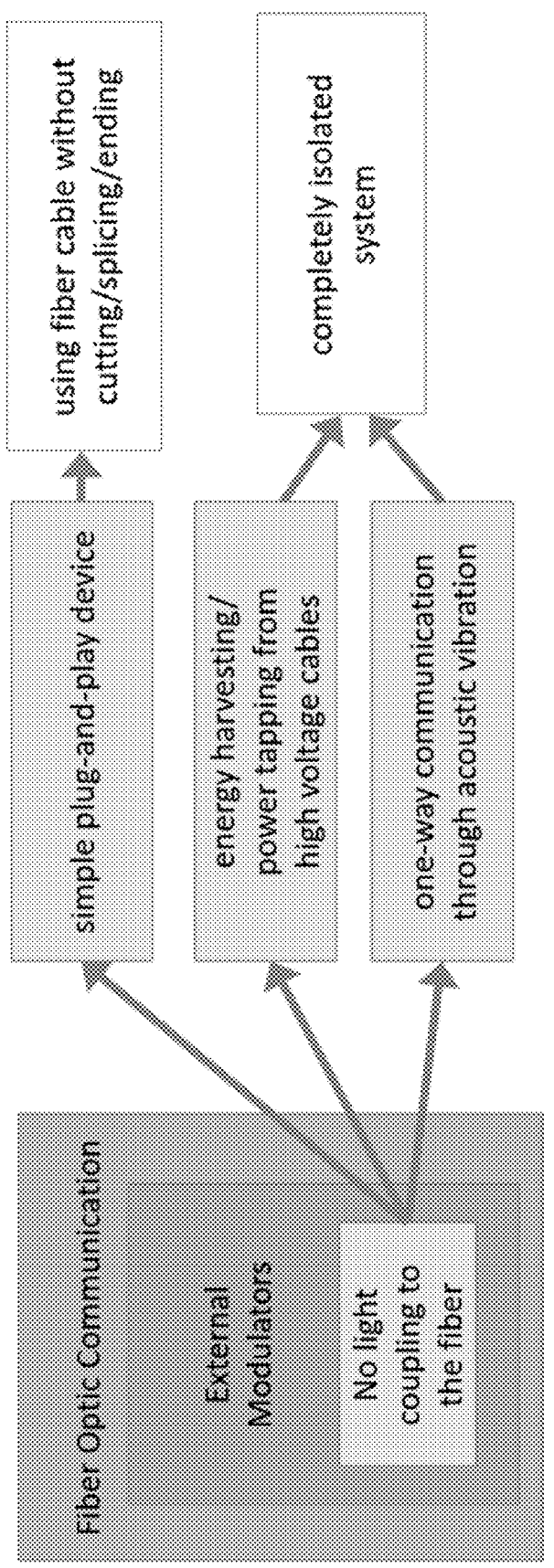
FIG. 12 is a schematic diagram showing illustrative features for DFOS/DAS systems employing our illustrative energy harvesting acoustic modem according to aspects of the present disclosure.

FIG. 12 is a schematic diagram showing illustrative features for DFOS/DAS systems employing our illustrative energy harvesting acoustic modem according to aspects of the present disclosure.

At this point, while we have presented this disclosure using some specific examples, those skilled in the art will recognize that our teachings are not so limited. Accordingly, this disclosure should be only limited by the scope of the claims attached hereto.

The invention claimed is:

1. A radio-controlled, two-way acoustic modem for providing data to a distributed fiber optic sensing (DFOS) system, the modem comprising:
   circuitry configured to
   receive, via a radio interface, wireless radio signals including configuration information for the acoustic modem, wherein the wireless radio signals including the configuration information originate from a remote controller;
   process the received wireless radio signals including the configuration information to modify operating parameters for the acoustic modem in accordance with the processed wireless radio signals including the configuration information; and
   in response to said modifying the operating parameters, cause n vibrators that are communicatively coupled to the circuitry and physically mounted at n different locations along an optical sensor fiber of the DFOS system to generate physical vibrations in accordance with the operating parameters wherein the physical vibrations encode sensor data for transmission to an interrogator of the DFOS system;
   wherein the generated physical vibrations are subsequently detected by the interrogator of the DFOS system to recover the encoded sensor data.

2. The radio-controlled, two-way acoustic modem according to claim 1 further comprising one or more sensors that measure physical environmental parameters, and the circuitry is further configured to process the measured physical environmental parameters to generate the physical vibrations according to the measured physical environmental parameters.

3. The radio-controlled, two-way acoustic modem according to claim 2, wherein the configuration information includes enabling or disabling the one or more sensors.

4. The radio-controlled, two-way acoustic modem according to claim 3 wherein the received wireless radio signals including the configuration information are transmitted from a fixed location.

5. The radio-controlled, two-way acoustic modem according to claim 3 wherein the received wireless radio signals including the configuration information are transmitted from a mobile vehicle.

6. The radio-controlled, two-way acoustic modem according to claim 1 wherein n is greater than 1 and the n vibrators generate the physical vibrations simultaneously at n different frequencies.

7. The radio-controlled, two-way acoustic modem according to claim 6 wherein the n different frequencies are simultaneously received by the interrogator of the DFOS system.

* * * * *